United States Patent [19]

Campbell

[11] 4,271,722
[45] Jun. 9, 1981

[54] AXLE DISCONNECT

[75] Inventor: Chris A. Campbell, Janesville, Wis.

[73] Assignee: Dana Corporation, Toledo, Ohio

[21] Appl. No.: 62,688

[22] Filed: Aug. 1, 1979

[51] Int. Cl.³ .......................... F16H 1/44; F16H 1/40
[52] U.S. Cl. .................................... 74/710.5; 74/713;
180/247
[58] Field of Search ...................... 74/710.5, 713, 711;
180/247, 24.09

[56] References Cited

U.S. PATENT DOCUMENTS

| 968,224 | 8/1910 | Wolf | 74/710.5 |
|---|---|---|---|
| 1,125,079 | 1/1915 | Dyer | 74/710.5 |
| 1,145,295 | 7/1915 | DeWitt | 74/710.5 |
| 1,212,795 | 1/1917 | Mayer et al. | 74/710.5 |
| 1,243,720 | 10/1917 | Eidson et al. | 74/710.5 |
| 1,458,877 | 6/1923 | Dair | 74/710.5 |
| 2,501,956 | 3/1950 | Misener | 74/710.5 |
| 2,770,150 | 11/1956 | Culverwell | 74/710 |
| 2,913,929 | 11/1959 | Anderson | 74/710.5 |
| 3,142,203 | 7/1964 | Bamford | 74/710.5 |
| 3,871,249 | 3/1975 | Jeffers | 74/713 X |
| 3,908,775 | 9/1975 | Van Fossen | 74/710.5 X |

Primary Examiner—Leslie Braun
Attorney, Agent, or Firm—Wilson, Fraser, Barker & Clemens

[57] ABSTRACT

A differential for a four wheel drive vehicle includes an integral remotely operable axle disconnect. The axle disconnect comprises a clutch collar suitably splined to each axle shaft which has face coupling teeth engageable with opposed mating teeth on the hub of each differential side gear. Axial motion is imparted to each clutch collar by a fork member and linkage driven by a suitable two-position actuator.

9 Claims, 4 Drawing Figures

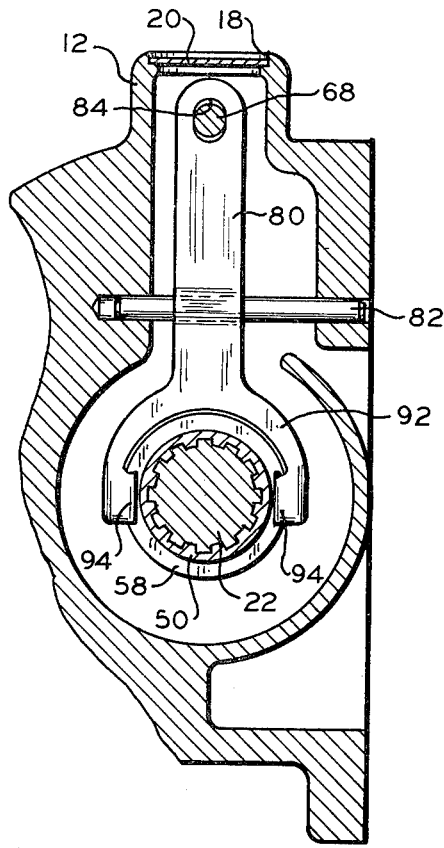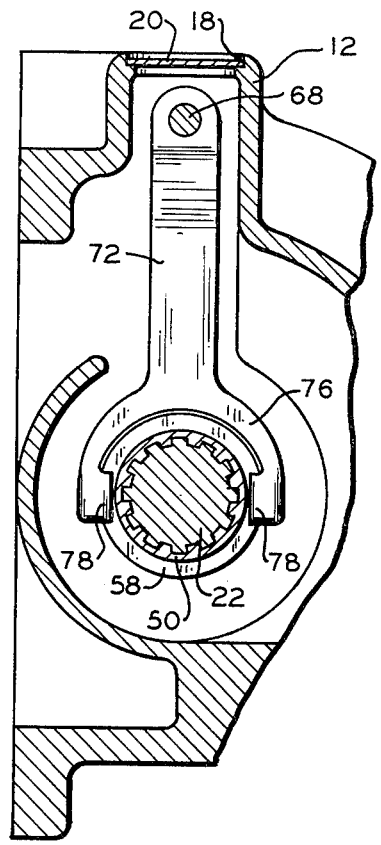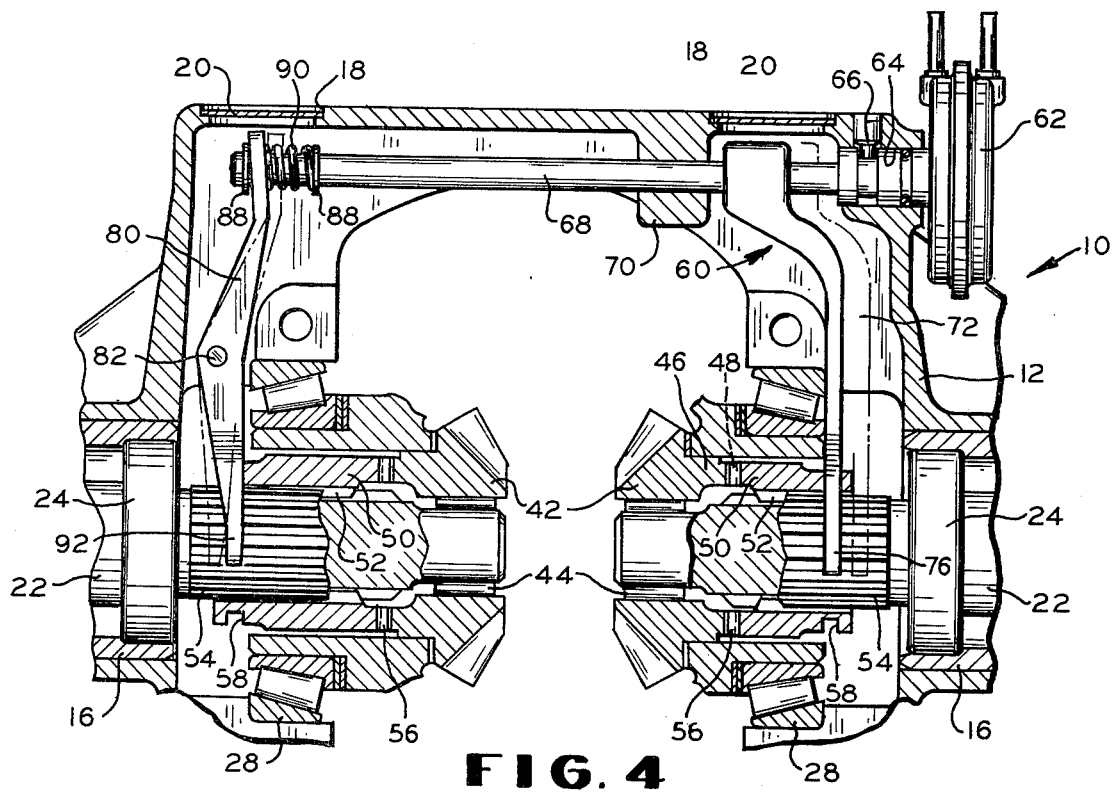

AXLE DISCONNECT

BACKGROUND OF THE INVENTION

The invention relates generally to an axle shaft disconnect and more specifically to integral means within a differential for selectively disconnecting the axle shafts from the output of one of a four wheel drive differential vehicle.

The tractive advantage of four wheel drive in construction, off road and sport vehicles is significant. The advantages of four wheel drive, however, are not conferred without a drive system and operating procedure which is more complex than those of comparable non-four wheel drive vehicles. Specifically, the vehicle must include a differential for the added driven axles, means to selectively supply power to the differential and means, such as hub locks, to selectively connect the wheels to the driven axles. These devices not only add to the mechanical complexity of the vehicle, but they also increase the operational complexity. This is especially true of the hub locks which are mounted on the hubs of the additionally driven wheels and which must be manually activated or deactivated. This, of course, requires the vehicle operator to stop and dismount the vehicle, and walk to each wheel and hub lock, and perform the requisite locking or unlocking step. The delay, danger and inconvenience of this operation performed at night or in inclement weather is apparent.

SUMMARY OF THE INVENTION

The instant invention comprises a differential for a four wheel drive vehicle which includes an integral remotely operable axle disconnect. The differential includes conventional elements such as a drive pinion and ring gear affixed to a differential spider which provides mounting for a pair of side gears and pinion gears according to conventional practice. The side gears include face coupling teeth on their outwardly directed hub surfaces and provide coaxial bearing surfaces within which the axle shafts are rotationally and independently positioned. A pair of shiftable clutch collars are slidably splined to the axle shaft and also include face coupling teeth. The face coupling teeth of the clutch collars are moved into and out of engagement with the mating face coupling teeth on the differential side gears by means of a two position actuator. The requisite mutually inwardly directed motion necessary to engage the clutch collars and mutually outwardly directed motion necessary to disengage the collars is provided by a direct control arm linkage from the single two-position actuator to one clutch collar and a pivoted lever arm linkage which reverses the actuator motion to the other clutch collar. Positive connection or disconnection of the axle shafts and driven wheels from the differential output provides driving power to the shafts and wheels or permits them to freewheel.

Thus it is the object of the instant invention to provide a differential having integral axle disconnect means.

It is a further object of the instant invention to provide a four wheel drive axle disconnect means which is remotely operable.

It is a still further object of the instant invention to provide an axle disconnect means which is adaptable to conventional differential housings and assemblies.

Still further objects and advantages of the instant invention will become apparent by reference to the following description and appended drawings.

BRIEF DESCRIPTION OF THE DRAWINGS

FIG. 2 is a fragmentary, sectional view of a differential incorporating the instant axle dissconnect means taken along line 2—2 of FIG. 1;

FIG. 3 is a fragmentary, sectional view of a differential incorporating the instant axle disconnect means taken along line 3—3 of FIG. 1.

FIG. 4 is a fragmentary, sectional view of an axle disconnect means according to the instant invention in an engaged position and further illustrating the disengaged position in phantom lines.

DESCRIPTION OF THE PRESENTLY PREFERRED EMBODIMENT

Figure 1:
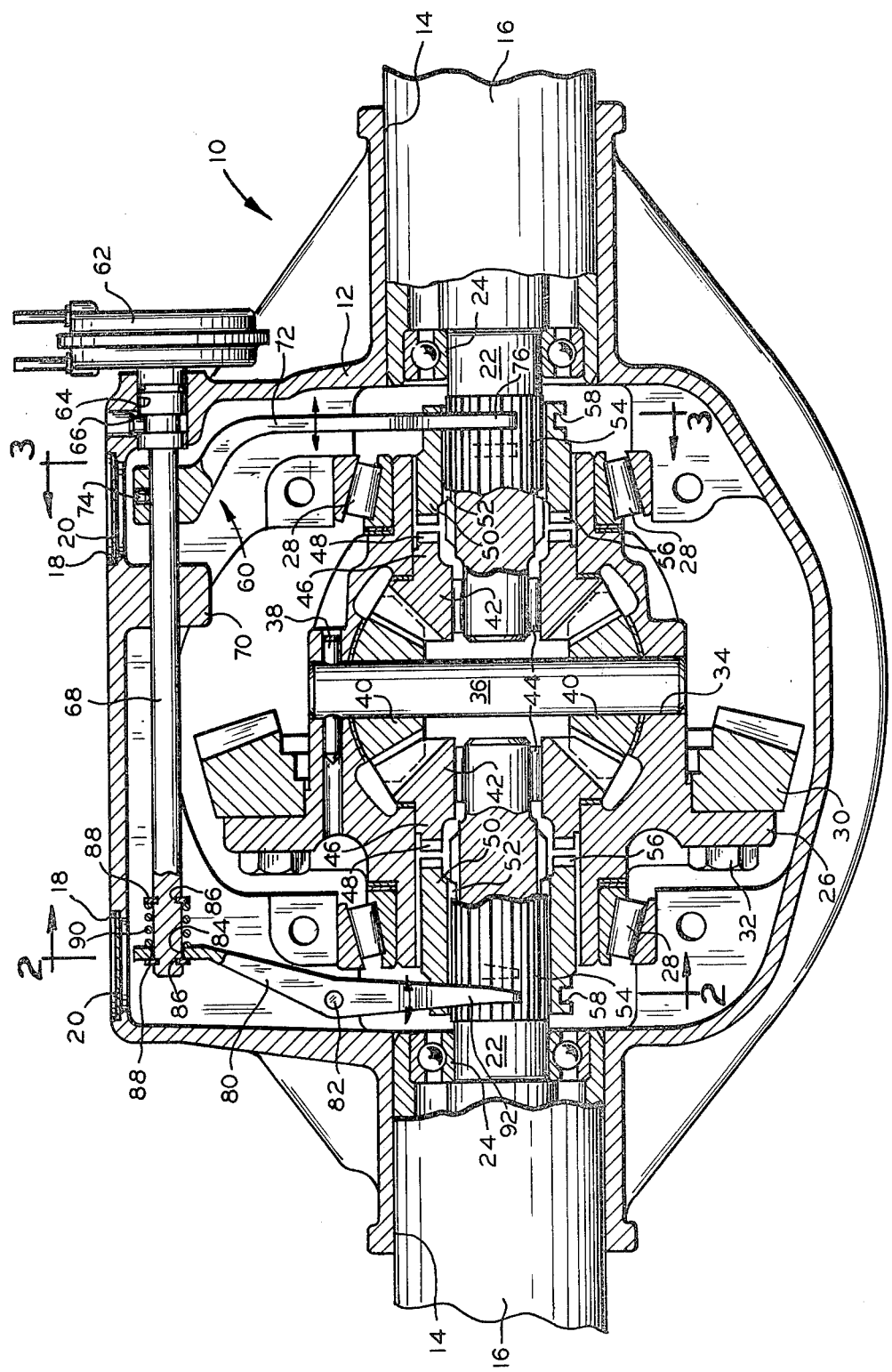
FIG. 1 is a full sectional view of a differential having axle disconnect means according to the instant invention.

Referring now to FIG. 1, a differential incorporating axle disconnect means according to the instant invention is generally designated by the reference numeral 10. The differential 10 includes a generally hollow, elliptical housing 12 which is preferably cast with various internal surfaces which support the components of the differential 10. Specifically, the housing includes bushing-like cylindrical openings 14 which each accept a hollow elongate axle housing 16. The housing 12 may also include appropriately located access or service ports 18 which are sealed by removable covers 20. Concentrically disposed within each axle housing 16 is an axle shaft 22 which is rotatably supported and positioned therein by suitable anti-friction bearings 24.

Disposed centrally within the housing 12 for rotation about the common axis of the axle shafts 22 is a differential spider 26. The differential spider 26 is supported for such rotation by a pair of anit-friction bearings 28 which are preferably of the tapered roller bearing type. A ring gear 30 is dismountably secured to the differential spider 26 by suitable threaded fasteners 32. The ring gear 30, preferably having a plurality of spiral bevel gear teeth, is disposed concentrically about the common axis of the axle shafts 22 and is driven by a mating pinion gear (not illustrated) in accordance with conventional differential design and practice.

The differential spider 26 further includes a pair of circular openings 34 within which is positioned a stub shaft 36 disposed normal to the common axis of axle shafts 22. The stub shaft 36 is retained within the differential spider 26 and specifically the openings 34 by means of a transversely disposed retention pin and pin receiving passage assembly 38. Rotatably and coaxially disposed upon the stub shaft 36 within the differential spider 26 are a pair of pinion gears 40. Engaging each of these pinion gears 40 and disposed concentrically about the axle shafts 22 are a pair of side gears 42. Anti-friction bearings such as roller bearings 44 are preferably disposed between and position and rotatably isolate the side gears 42 from the axle shafts 22. Each of the side gears 42 also includes a hub portion 46 having a plurality of radially disposed gear teeth 48 on its outwardly directed face.

A clutch collar 50 is positioned concentrically about and generally adjacent each inward termini of the axle shafts 22. The clutch collars 50 each include a female spline 52 which mates with a complementary male spline 54 formed in each of the axle shafts 22. The mating female and male splines 52 and 54, respectively, permit relative axial motion between the clutch collars 50 and the axle shafts 22 while inhibiting relative rotational motion therebetween. The clutch collars 50 further each include a plurality of radially disposed gear teeth 56 on their inwardly directed surfaces which are complementary to and engageable with the gear teeth 48 of the side gears 42. Lastly, the clutch collars 50 each define an annular groove 58 disposed about their periphery adjacent the outer ends of the clutch collars 50.

The differential 10 also includes an actuator assembly 60. The actuator assembly 60 includes a two position actuator 62. The actuator 62 illustrated is pneumatic and may operate on pressurized air or a vacuum to provide linear travel between a first and second position. Actuators powered by hydraulic fluid, electricity, or other means which are drivable between a first and second position are equally suitable for use with the instant invention. The actuator 62 is secured within a suitable opening 64 in the housing 12 by a suitable, semi-permanent retention means 66. The actuator assembly 60 further includes an elongate control rod 68 which the actuator 62 drives between said first and said second position. The control rod 68 may be stabilized by positioning it within a suitably bored support which may be integrally formed with the differential housing 12.

Referring now to FIGS. 1 and 3, the actuator assembly 60 further includes a fork or control member 72 which is positively secured to the control rod 68 by means of a suitable fastener such as set screw 74. The control member 72 extends toward the axle shaft 22 illustrated on the right of FIG. 1 and in terminated by a bifurcated portion or yoke 76. The yoke 76 is generally semi-circular in configuration and includes a pair of opposed, inwardly directed tabs 78 which seat within and engage the annular groove 58 of the right clutch collar 50.

Referring now to FIGS. 1 and 2, the actuator assembly 60 also includes a second control member in the form of a lever arm 80 which is pivoted about a fixed support 82 which is in turn secured to the differential housing 12. The lever arm 80 includes an aperture 84 through which the control rod 68 passes freely. The control rod 68 includes spaced apart annular grooves 86 which provide positive mounting for a pair of circular, radially extending retaining means such as C-washers 88. A compression spring 90 disposed between the C-washer 88 most proximate the actuator 62 and the lever arm 80 springingly transfers axial motion of the control rod 68 to the lever arm 80. Preferably, the compression spring 90 has a free length somewhat greater than the distance between the lever arm 80 and the rightmost C-washer 88 such that when installed as illustrated in FIG. 1, it provides a leftwardly directed biasing force or preload against the lever arm 80. The lever arm 80, like the control member 72, is terminated by a bifurcated portion or yoke 92 having two opposed, inwardly directed tabs 94. The tabs seat within and engage the annular groove 58 in the left clutch collar 50.

The actuator assembly 60 is an important feature of the differential 10 and significantly contributes to the performance of the invention as well as advancing the state of the differential art. As FIG. 1 illustrates, the line of action of the actuator 62 and specifically the associated control rod 68 is generally parallel to and spaced from the axis of the shafts 22 and the clutch collars 50. The control member 72 associated with the right clutch collar 50 is rigidly (though semi-permanently) attached to the control rod 68 by the set screw 74 and thus directly transfers motion from the actuator 62 and rod 68 to the right clutch collar 50.

Proper engagement between the face coupling teeth 48 on the right side gear 42 and the mating teeth 56 on the right clutch collar 50 may thus be achieved by driving the actuator 62 to its engaged position, loosening the set screw 74, appropriately positioning the control member 72 on the control rod 68 for proper tooth engagement and retightening the set screw 74.

As has been previously explained, the mutual inward or outward movement of the clutch collars 50 necessary to simultaneously engage or disengage them is achieved by the incorporation of the lever arm 80. The lever arm 80 is driven to the left or right above the pivot or support 82 (as viewed in FIG. 1) and drives the left clutch collar 50 to the right or left.

In order to ensure proper engagement of both of the clutch collars 50 as well as simplify assembly and adjustment of the actuator assembly 60, the mechanical connection between the lever arm 80 and the control rod 68 is not rigid or positive, as is the case with the connection between the control member 72 and the control rod 68, but is rather a resilient connection incorporating the compression spring 90. The linear travel and force of the actuator 62, transferred by the control rod 68 is springingly transferred to the lever arm 80 through the spring 90.

The utilization of such a spring provides at least two advantages. In the absence of the spring, the limit of engaging travel (to the left) of the control rod 68 will be determined by either the limit of actuator travel, or the point of maximum engagement of the first engaging pair of gear teeth 48 and 56. It is possible that the other pair of engaging gear teeth 48 and 56 will not be fully or sufficiently engaged at this point to reliably transmit power with minimum wear. Utilization of the compression spring 90 allows the right pair of gear teeth 48 and 56 to engage fully as has been previously described while the spring 90 absorbs any control rod translation in excess of that necessary to fully seat the left pair of gear teeth 48 and 56 or provides, through preload, additional translation in excess of that provided by the actuator or limited by the engagement of the right pair of gear teeth 48 and 56 necessary to fully engage the left pair of gear teeth 48 and 56.

The utilization of the spring also minimizes and simplifies adjustment of the actuator assembly 60 and clutch collars 50 since it provides a mechanism which both compensates for wear of the gear teeth 48 and 56, collar grooves 58 and associated components and precludes the need to independently adjust the axial position of the control member 72 and lever arm 80 relative to the control rod 68 for proper engagement of the associated gear teeth 48 and 56.

Operation of the differential 10 incorporating an axle disconnect according to the instant invention is best understood by reference to FIGS. 1 and 4. In FIG. 1, the differential 10 is illustrated with the drive to the axle shafts 22 in its disconnected or freewheeling mode. Specifically, the actuator 62 and associated control rod 68 is in its first, rightmost position and thus the right and left clutch collars 50 and specifically the gear teeth 56 disposed thereon are disengaged from the gear teeth 48 disposed upon the side gears 42. Thus the axle shafts 22 are rotationally independent from the side gears 42 and the other components contained within the differential spider 26 and may freewheel independently of one another.

Referring now to FIG. 4, the actuator 62 and associated control rod 68 are shown in their second position wherein the axle shafts 22 through the mating gear teeth 48 and 56 are locked to the side gears 42. Specifically, the control rod 68 has moved to its leftmost position and the clutch collars 50, through the control member 72 and lever arm 80 have been driven inwardly toward the side gears 42, engaging the mating gear teeth 48 and 56. Power may thus be transferred from the ring gear 30, through the differential spider 26 and the components mounted therein to the side gears 42, through the mating gear teeth 48 and 56, to the splined clutch collars 50 and thus to the axle shafts 22.

It should be noted that the changeover from connected to disconnected axle shafts or vice versa is quickly and conveniently accomplished remotely by means of an appropriate control system associated with the actuator 62. The activating control for the actuator 62 may thus be located in the cab of the vehicle within the driver's reach, obviating the necessity and inconvenience of stopping the vehicle and dismounting it to reposition the hub locks.

The foregoing disclosure is the best mode devised by the inventor for practicing this invention. It is apparent, however, that devices incorporating modifications and variations to the instant invention will become obvious to one skilled in the art of four wheel drive systems. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

The embodiments of the invention in which an exclusive property is claimed are defined as follows:

1. A differential for a motor vehicle comprising, in combination,
   a housing,
   a spider positioned within said housing for rotation about an axis,
   a ring gear secured to said spider and disposed concentrically about said axis,
   a stub shaft disposed perpendicularly to said axis and secured within said spider,
   a pair of spaced apart pinion gears disposed on said stub shaft,
   a pair of spaced apart side gears disposed about said axis in interengaging relationship with each of said pair of pinion gears, said side gears each including outwardly directed face coupling gear teeth,
   a pair of axle shafts disposed along said axis having spaced apart termini generally disposed within said sider, said axle shafts defining a spline adjacent said termini,
   a clutch collar disposed about each of said axle shafts having a complementary spline in engagement with said spline of said axle shafts, said clutch collars each including inwardly directed face coupling gear teeth, and
   a control member, an actuator means for moving said control member between a first position and a second position, a control arm rigidly secured at one end to said control member and having means disposed at its opposite end for engaging and axially translating one of said clutch collars, a lever arm pivotally secured within said housing having means disposed at one end for engaging and axially translating the other of said clutch collars, and means for connecting the other end of said lever arm to said control member whereby said coupling teeth of said clutch collars and said coupling teeth of said side gears are engaged in power transmitting relationship in said first position and said coupling teeth of said clutch collars and said coupling teeth of said side gears are disposed in rotationally independent relationship in said second position.

2. The differential of claim 1, wherein said clutch collars define an annular groove about their peripheries which receive said means for engaging and axially translating said clutch collars.

3. The differential of claim 1, wherein the axis along which said control member translates while moving said first and said second positions is substantially parallel to said axis of rotation of said spider.

4. The differential of claim 1, wherein said actuator means is pneumatically activated.

5. The differential of claim 1, wherein said means for engaging and axially translating said clutch collars includes a first control fork having at least two opposed tab means for engaging an annular groove disposed about the periphery of said clutch collars.

6. The differential of claim 1, wherein said lever arm defines an aperture proximate said other end through which said conrol member extends.

7. The differential of claim 1 or claim 6, wherein said connecting means is disposed coaxially about said control member between said lower arm and a stop disposed on said control member.

8. The differential of claim 7, wherein the free length of said spring means is greater than the distance between said lever arm and said stop when said control member is in said first position.

9. The differential of claim 1, wherein said means for connecting the other end of said lever arm to said control member includes a spring means for resiliently connecting said other end to said rod.

* * * * *